United States Patent
Chuang et al.

(10) Patent No.: US 11,973,958 B2
(45) Date of Patent: Apr. 30, 2024

(54) METHOD AND APPARATUS OF SAMPLE CLIPPING FOR PREDICTION REFINEMENT WITH OPTICAL FLOW IN VIDEO CODING

(71) Applicant: HFI Innovation Inc., Zhubei (TW)

(72) Inventors: Tzu-Der Chuang, Hsinchu (TW); Ching-Yeh Chen, Hsinchu (TW); Zhi-Yi Lin, Hsinchu (TW)

(73) Assignee: HFI INNOVATION INC., Zhubei (TW)

( * ) Notice: Subject to any disclaimer, the term of this patent is extended or adjusted under 35 U.S.C. 154(b) by 197 days.

(21) Appl. No.: 17/762,317

(22) PCT Filed: Sep. 22, 2020

(86) PCT No.: PCT/CN2020/116712
§ 371 (c)(1),
(2) Date: Mar. 21, 2022

(87) PCT Pub. No.: WO2021/052510
PCT Pub. Date: Mar. 25, 2021

(65) Prior Publication Data
US 2022/0353508 A1   Nov. 3, 2022

Related U.S. Application Data

(60) Provisional application No. 62/906,445, filed on Sep. 26, 2019, provisional application No. 62/903,986, (Continued)

(51) Int. Cl.
*H04N 19/137*   (2014.01)
*H04N 19/132*   (2014.01)
(Continued)

(52) U.S. Cl.
CPC ......... *H04N 19/137* (2014.11); *H04N 19/132* (2014.11); *H04N 19/176* (2014.11); *H04N 19/182* (2014.11)

(58) Field of Classification Search
CPC .. H04N 19/105; H04N 19/132; H04N 19/137; H04N 19/139; H04N 19/176;
(Continued)

(56) References Cited

U.S. PATENT DOCUMENTS

2004/0042651 A1   3/2004   Ii et al.
2008/0240241 A1   10/2008  Mishima et al.
(Continued)

FOREIGN PATENT DOCUMENTS

CN            101277419 A      10/2008

OTHER PUBLICATIONS

International Search Report and Written Opinion dated Dec. 23, 2020, issued in application No. PCT/CN2020/116712.
(Continued)

*Primary Examiner* — Mohammed S Rahaman
(74) *Attorney, Agent, or Firm* — McClure, Qualey & Rodack, LLP (57) ABSTRACT

Methods and apparatus of video coding using sub-block based affine mode are disclosed. According to this method, control-point motion vectors (MVs) associated with the affine mode are determined for a block. A sub-block MV is derived for a target sub-block of the block from the control-point MVs for the block. A prediction offset is determined for a target pixel of the target sub-block using information comprising a pixel MV offset from the sub-block MV for the target pixel according to Prediction Refinement with Optical Flow (PROF). The target pixel of the target sub-block is encoded or decoded using a modified predictor. The modified prediction is generated by clipping the prediction offset
(Continued)

to a target range and combining the clipped prediction offset with an original predictor.

8 Claims, 3 Drawing Sheets

Related U.S. Application Data filed on Sep. 23, 2019, provisional application No. 62/903,847, filed on Sep. 22, 2019, provisional application No. 62/903,884, filed on Sep. 22, 2019.

(51) Int. Cl.
*H04N 19/176* (2014.01)
*H04N 19/182* (2014.01)

(58) Field of Classification Search
CPC .. H04N 19/182; H04N 19/184; H04N 19/513; H04N 19/521; H04N 19/54; H04N 19/70
See application file for complete search history.

(56) References Cited

U.S. PATENT DOCUMENTS

| | | | |
|---|---|---|---|
| 2016/0205401 A1* | 7/2016 | Guo | H04N 19/126 375/240.03 |
| 2020/0296405 A1* | 9/2020 | Huang | H04N 19/137 |
| 2020/0314443 A1* | 10/2020 | Huang | H04N 19/70 |

OTHER PUBLICATIONS

Luo, J., et al.; "CE2-related: Prediction refinement with optical flow for affine mode;" Joint Video Experts Team (JVET) of ITU-T SG 16 WP 3 and ISO/IEC JTC 1/SC 29/WG 11; Mar. 2019; pp. 1-32.

Bross, B., et al.; "Versatile Video Coding (Draft 6);" Joint Video Experts Team (JVET) of ITU-T SG 16 WP 3 and ISO/IEC JTC 1/SC 29/WG 11; Jul. 2019; pp. 1-456.

Chinese language office action dated Oct. 28, 2021, issued in application No. TW 109132698.

\* cited by examiner

METHOD AND APPARATUS OF SAMPLE CLIPPING FOR PREDICTION REFINEMENT WITH OPTICAL FLOW IN VIDEO CODING

CROSS REFERENCE TO RELATED APPLICATIONS

The present invention claims priority to U.S. Provisional Patent Application, Ser. 62/903,847, filed on Sep. 22, 2019, U.S. Provisional Patent Application, Ser. No. 62/903,884, filed on Sep. 22, 2019, U.S. Provisional Patent Application, Ser. No. 62/903,986, filed on Sep. 23, 2019, and U.S. Provisional Patent Application, Ser. No. 62/906,445, filed on Sep. 26, 2019. The U.S. Provisional Patent Applications are hereby incorporated by reference in their entireties.

FIELD OF THE INVENTION

The present invention relates to video coding using Prediction Refinement with Optical Flow (PROF). In particular, the present invention relates to data clipping for video coding systems using PROF for avoid the need for extending bit depth due to PROF operations.

BACKGROUND AND RELATED ART

Various video coding standards have been developed over the past two decades. In newer coding standards, more powerful coding tools are used to improve the coding efficiency. High Efficiency Video Coding (HEVC) is a new coding standard that has been developed in recent years. In the High Efficiency Video Coding (HEVC) system, the fixed-size macroblock of H.264/AVC is replaced by a flexible block, named coding unit (CU). Pixels in the CU share the same coding parameters to improve coding efficiency. A CU may begin with a largest CU (LCU), which is also referred as coded tree unit (CTU) in HEVC. In addition to the concept of coding unit, the concept of prediction unit (PU) is also introduced in HEVC. Once the splitting of CU hierarchical tree is done, each leaf CU is further split into one or more prediction units (PUs) according to prediction type and PU partition.

In most coding standards, adaptive Inter/Intra prediction is used on a block basis. In the Inter prediction mode, one or two motion vectors are determined for each block to select one reference block (i.e., uni-prediction) or two reference blocks (i.e., bi-prediction). The motion vector or motion vectors are determined and coded for each individual block. In HEVC, Inter motion compensation is supported in two different ways: explicit signaling or implicit signaling. In explicit signaling, the motion vector for a block (i.e., PU) is signaled using a predictive coding method. The motion vector predictors correspond to motion vectors associated with spatial and temporal neighbors of the current block. After a MV predictor is determined, the motion vector difference (MVD) is coded and transmitted. This mode is also referred as AMVP (advanced motion vector prediction) mode. In implicit signaling, one predictor from a candidate predictor set is selected as the motion vector for the current block (i.e., PU). Since both the encoder and decoder will derive the candidate set and select the final motion vector in the same way, there is no need to signal the MV or MVD in the implicit mode. This mode is also referred as Merge mode. The forming of predictor set in Merge mode is also referred as Merge candidate list construction. An index, called Merge index, is signaled to indicate the predictor selected as the MV for current block.

Motion occurs across pictures along temporal axis can be described by a number of different models. Assuming A(x, y) be the original pixel at location (x, y) under consideration, A' (x', y') be the corresponding pixel at location (x', y') in a reference picture for a current pixel A(x, y), the affine motion models are described as follows.

The affine model is capable of describing two-dimensional block rotations as well as two-dimensional deformations to transform a square (or rectangles) into a parallelogram. This model can be described as follows:

$$x' = a_0 + a_1 * x + a_2 * y, \text{ and}$$

$$y' = b_0 + b_1 * x + b_2 * y. \qquad (1)$$

In contribution ITU-T13-SG16-C1016 submitted to ITU-VCEG (Lin, et al., "Affine transform prediction for next generation video coding", ITU-U, Study Group 16, Question Q6/16, Contribution C1016, September 2015, Geneva, CH), a four-parameter affine prediction is disclosed, which includes the affine Merge mode. When an affine motion block is moving, the motion vector field of the block can be described by two control-point motion vectors or four parameters as follows, where (vx, vy) represents the motion vector $$\begin{cases} x' = ax + by + e \\ y' = -bx + ay + f \\ vx = x - x' \\ vy = y - y' \end{cases} \xrightarrow{\Delta} \begin{cases} vx = (1-a)x - by - e \\ vy = (1-a)y + bx - f \end{cases} \qquad (2)$$

Figure 1A:
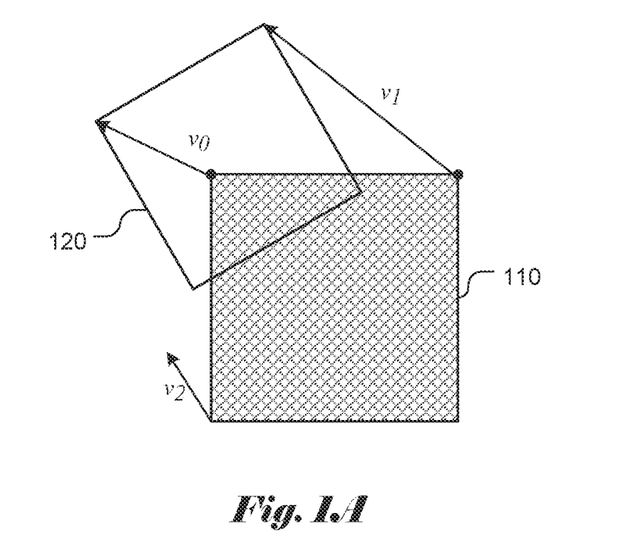
FIG. 1A illustrates an example of the four-parameter affine model, where the transformed block is still a rectangular block.

An example of the four-parameter affine model is shown in FIG. 1A, where a corresponding reference block 120 for the current block 110 is located according to an affine model with two control-point motion vectors (i.e., $v_0$ and $v_1$). The transformed block is a rectangular block. The motion vector field of each point in this moving block can be described by the following equation:

$$\begin{cases} v_x = \dfrac{(v_{1x} - v_{0x})}{w} x - \dfrac{(v_{1y} - v_{0y})}{w} y + v_{0x} \\ v_y = \dfrac{(v_{1y} - v_{0y})}{w} x + \dfrac{(v_{1x} - v_{0x})}{w} y + v_{0y} \end{cases} \qquad (3)$$

Figure 1B:
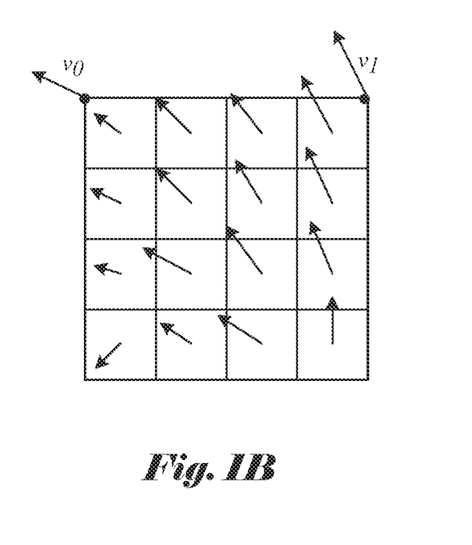
FIG. 1B illustrates an example of motion vectors for a current block determined for each 4×4 sub-block based on the MVs of the two control points.

In the above equations, $(v_{0x}, v_{0y})$ is the control point motion vector (i.e., $v_0$) at the upper-left corner of the block, and $(v_{1x}, v_{1y})$ is another control point motion vector (i.e., $v_1$) at the upper-right corner of the block. When the MVs of two control points are decoded, the MV of each 4×4 block of the block can be determined according to the above equation. In other words, the affine motion model for the block can be specified by the two motion vectors at the two control points. Furthermore, while the upper-left corner and the upper-right corner of the block are used as the two control points, other two control points may also be used. An example of motion vectors for a current block can be determined for each 4×4 sub-block based on the MVs of the two control points as shown in FIG. 1B according to equation (3). MV of the center sample of a 4×4 sub-block (i.e., (m+2, n+2) position, where (m, n) is the top-left sample position of the 4×4 sub-block) represents the MV of the 4×4 sub-block. The MV precision of each 4×4 sub-block is 1/16 luma sample. The reason of using 4×4 block as one sub-block, not using other smaller size is to achieve a good trade-off between the computation complexity of motion compensation and coding efficiency.

The six-parameter affine model uses 3 control points ($\vec{v}_0$, $\vec{v}_1$ and $\vec{v}_2$) as shown in FIG. 1A. The six-parameter affine motion model is capable of transforming a rectangle into a parallelogram. When the MVs ($v_0$, $v_1$ and $v_2$) of three control points are decoded, the MV of each 4×4 block can be derived according to the following equation:

$$\begin{cases} v_x = \frac{(v_{1x} - v_{0x})}{w}x + \frac{(v_{2y} - v_{0y})}{h}y + v_{0x} \\ v_y = \frac{(v_{1y} - v_{0y})}{w}x + \frac{(v_{2x} - v_{0x})}{h}y + v_{0y} \end{cases} \quad (4)$$

In order to improve the coding efficiency, several methods have been proposed in JVET-N0236, JVET-N0261, and JVET-N0262. In JVET-N0236 (J. Luo, et al., "CE2-related: Prediction refinement with optical flow for affine mode", Joint Video Experts Team (JVET) of ITU-T SG16 WP 3 and ISO/IEC JTC 1/SC 29/WG 11, 14th Meeting: Geneva, CH, 19-27 Mar. 2019, Document: JVET-N0236), this contribution proposes a method to refine the sub-block based affine motion compensated prediction with optical flow to achieve a finer granularity of motion compensation. After the sub-block based affine motion compensation is performed, each luma prediction sample is refined by adding a difference derived by the optical flow equation. The proposed PROF is described as following four steps. Step 1): The sub-block-based affine motion compensation is performed to generate sub-block prediction I(i,j). Step 2): The spatial gradients g_x (i, j) and g_y (i, j) of the sub-block prediction are calculated at each sample location using a 3-tap filter [−1, 0, 1].

$$g\_x(i,j) = I(i+1,j) - I(i-1,j)$$

$$g\_y(i,j) = I(i,j+1) - I(i,j-1) \quad (5)$$

Figure 2:
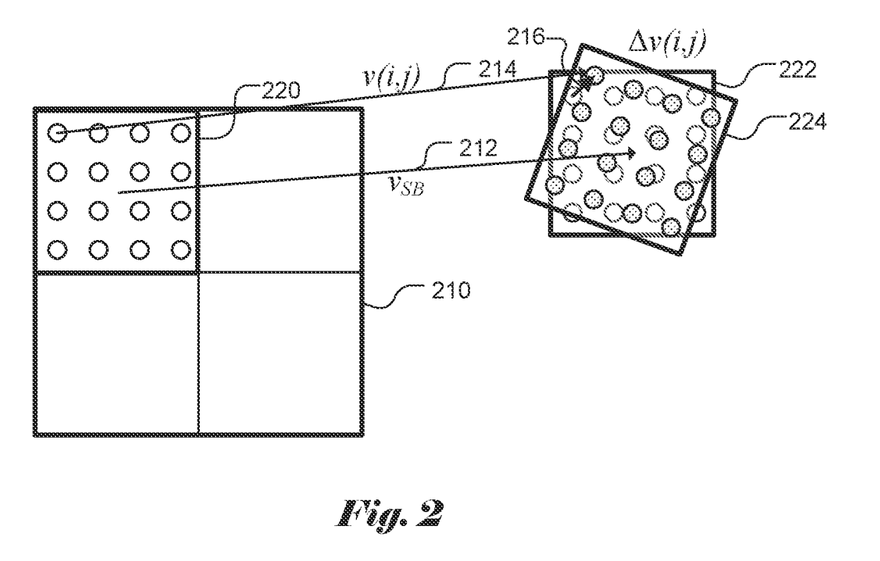
FIG. 2 illustrates an example of sub-block based affine motion compensation, where the motion vectors for individual pixels of a sub-block are derived according to motion vector refinement.

The sub-block prediction is extended by one pixel on each side for the gradient calculation. To reduce the memory bandwidth and complexity, the pixels on the extended borders are copied from the nearest integer pixel position in the reference picture. Therefore, additional interpolation for padding region is avoided. Step 3): The luma prediction refinement is calculated by the optical flow equation.

$$\Delta I(i,j) = g\_x(i,j)*\Delta v\_x(i,j) + g\_y(i,j)*\Delta v\_y(i,j). \quad (6)$$

where the $\Delta v(i,j)$ (also named pixel motion vector offset in this disclosure) is the difference between the pixel MV computed for sample location (i,j), denoted by v(i,j), and the sub-block MV of the sub-block to which pixel (i,j) belongs, as shown in FIG. 2. In FIG. 2, sub-block 222 corresponds to a reference sub-block for sub-block 220 as pointed by the motion vector $v_{SB}$ (212). The reference sub-block 222 represents a reference sub-block resulted from translational motion of block 220. Reference sub-block 224 corresponds to a reference sub-block with PROF. The motion vector for each pixel is refined by $\Delta v(i,j)$. For example, the refined motion vector v(i,j) 214 for the top-left pixel of the sub-block 220 is derived based on the sub-block MV $v_{SB}$ (212) modified by $\Delta v(i,j)$ 216.

Since the affine model parameters and the pixel location relative to the sub-block center are not changed from sub-block to sub-block, $\Delta v(i,j)$ can be calculated for the first sub-block, and reused for other sub-blocks in the same CU. Let x and y be the horizontal and vertical offset from the pixel location to the center of the sub-block, $\Delta v(x,y)$ can be derived by the following equation, $$\begin{cases} \Delta v_x(x, y) = c*x + d*y \\ \Delta v_y(x, y) = e*x + f*y \end{cases} \quad (7)$$

For 4-parameter affine model, $$\begin{cases} c = f = \frac{v_{1x} - v_{0x}}{w} \\ e = -d = \frac{v_{1y} - v_{0y}}{w} \end{cases} \quad (8)$$

For 6-parameter affine model, $$\begin{cases} c = \frac{v_{1x} - v_{0x}}{w} \\ d = \frac{v_{2x} - v_{0x}}{h} \\ e = \frac{v_{1y} - v_{0y}}{w} \\ f = \frac{v_{2y} - v_{0y}}{h} \end{cases} \quad (9)$$

where ($v_{0x}$, $v_{0y}$), ($v_{1x}$, $v_{1y}$), ($v_{2x}$, $v_{2y}$) are the top-left, top-right and bottom-left control point motion vectors (i.e., $v_2$ in FIG. 1A), w and h are the width and height of the CU.

Step 4): Finally, the luma prediction refinement is added to the sub-block prediction I(i,j). The final prediction I' is generated as the following equation.

$$I'(i,j) = I(i,j) + \Delta I(i,j) \quad (10)$$

For the PROF operation in VTM-6.0, the gradient is limited to 11 bits and the delta MV (i. e., $\Delta v$) is in the range from −64 to 64, which is 7 bits. The refinement offset (i. e., $\Delta I$) is in 17 bits. The predictor I is in 16 bits. Therefore, the refined predictor I' will be in 17 bits, which is not friendly for single instruction multiple data (SIMD) implementation when these refined predictors are processed by bi-prediction average or weighted average because the 16 bits SIMD instruction cannot be applied for 17 bits data. For 17 bits data, the 32 bits SIMD instruction is applied, which only have half of the processing throughput compared with 16 bits SIMD instruction.

BRIEF SUMMARY OF THE INVENTION

Methods and apparatus of video coding performed by a video encoder or a video decoder that utilizes a coding tool set comprising an affine mode ise disclosed. According to this method, input data related to a current block are received at a video encoder side or a video bitstream corresponding to compressed data including the current block is received at a video decoder side, where the affine mode is allowed for the current block. Two or more control-point motion vectors associated with the affine mode are determined for the current block. A sub-block motion vector is derived for a target sub-block of the current block from said two or more control-point motion vectors for the current block. A prediction offset is determined for a target pixel of the target sub-block using first information comprising a pixel motion vector offset from the sub-block motion vector for the target pixel according to Prediction Refinement with Optical Flow (PROF). The target pixel of the target sub-block is encoded or decoded using a modified predictor, wherein the modified prediction is generated by clipping the prediction offset to a first target range and combining the clipped prediction offset with an original predictor, or the modified prediction is generated by clipping a refined predictor to a second target range, and wherein the refined predictor is derived by combining the original predictor and the prediction offset.

In one embodiment, the prediction offset is clipped to K bits, wherein K is a positive integer. For example, the first target range may correspond to $[-2^{(K-1)}, 2^{(K-1)}-1]$. In one embodiment, the K is set to max(14, bit-depth+2) and the bit-depth corresponds to sample bit depth of the current block. When the sample bit depth of the current block is equal to 10 bits, the K is set to 14. When the sample bit depth of the current block is equal to 10 bits, the first target range is equal to [−8192, 8191]. In another embodiment, the first target range corresponds to [−dILimit, dILimit−1], wherein the dILimit is set to 1<<max(13, bit-depth+1) and the bit-depth corresponds to sample bit depth of the current block. In another example, the second target range corresponds to $[-2^{(K-1)}, 2^{(K-1)}-1]$ and the K is set to max(16, bit-depth+4) and the bit-depth corresponds to sample bit depth of the current block.

The pixel motion vector offset can be derived based on second information related to pixel position offset from a center of the target sub-block and said two or more control-point motion vectors. For example, the prediction offset can be derived based on a linear combination of the pixel motion vector offset in x direction and the pixel motion vector offset in y direction.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

To achieve SIMD (Single Instruction Multiple Data) implementation friendly design, it is proposed to clip the prediction offset or the predictor after refinement, or even clip the interpolation results into a certain range to prevent bit-depth of refined predictor from exceeding than 16 bits.

In the first proposed method, the prediction offset (ΔI) is clipped toa certain predefined range or a derived range depending on the input, output or target bit-depth. For example, the prediction offset can be clipped to 14, 15 or 16 bits, where the range can be [−8192, 8191], [−16384, 16383] or [−32768, 32767] respectively, or can be [0, 16383] or [0, 32767] or [0, 65535] respectively. In another example, the prediction offset can be clipped within the range of [−2^(K−1), 2^(K−1)−1] or [2^K−1], where the K (a positive integer) can be max(14, bit-depth+4), (bit-depth+6−max(2, 14−bit-depth)), min(16, bit-depth+4), min(15, bit-depth+4), (bit-depth+4), max(14, bit-depth+5), (bit-depth+7−max(2, 14−bit-depth)), min(16, bit-depth+5), min(15, bit-depth+5), (bit-depth+5), (bit-depth+max(2, 14−bit-depth)+1), (bit-depth+max(2, 14−bit-depth)), (bit-depth+max(2, 14−bit-depth)−1), (bit-depth+max(2, 14−bit-depth)+2), min(16, bit-depth+max(2, 14−bit-depth)), min(15, bit-depth+max(2, 14−bit-depth)), min(14, bit-depth+max(2, 14−bit-depth)), max(16, bit-depth+max(2, 14-bit-depth)), max(15, bit-depth+max(2, 14−bit-depth)), max(14, bit-depth+max(2, 14−bit-depth)), max(13, bit-depth+2), max(13, bit-depth+1), max(14, bit-depth+3), max(14, bit-depth+2), max(15, bit-depth+1), max(15, bit-depth+2), max(15, bit-depth+3), max(15, bit-depth+4), max(16, bit-depth+4), max(16, bit-depth+5), max(N, bit-depth+M) where N is a positive integer and M is an integer, (bit-depth+max(O, P−bit-depth)+Q) where the O is a positive integer and P and Q are integers, (bit-depth+max(R, S+bit-depth)+T) where the R is a positive integer and S and T are integers, max(16, sample bit-depth+max(2, 14−sample bit-depth)+1), max(16, sample bit-depth+max(2, 14−sample bit-depth)), max(16, sample bit-depth+max(2, 14−sample bit-depth)+2), max(16, sample bit-depth+max(2, 14−sample bit-depth)+3), max(16, sample bit-depth+max(2, 14−sample bit-depth)−1), or max(16, sample bit-depth+3). The notation of 2^K means 2 to the power of K, which can also be represented as 1<<K or $2^K$.

As shown above, various examples of clipping the prediction offset are illustrated according to the present invention. Different syntaxes may be used to represent the variables mentioned. For example, the prediction offset (ΔI) can be represented as dI in the emerging VVC (Versatile Video Coding) standard JVET-O2001 (B. Bross, et al., "Versatile Video Coding (Draft 10)", Joint Video Experts Team (WET) of ITU-T SG 16 WP 3 and ISO/IEC JTC 1/SC 29/WG 11, 15th Meeting: Gothenburg, SE, 3-12 Jul. 2019, Document: JVET-O2001). The dI is clipped to the range from −dILimit to dILimit in JVET-O2001, where the dIlimit is equivalent to the value of 2^(K−1) in the above examples. In this example, the variable dI is derived as follows:

$$dI = \text{Clip3}(-dI\text{Limit}, dI\text{Limit}-1, \text{gradient}H[x][y] * \text{diff}Mv[x][y][0] + \text{gradient}V[x][y] * \text{diff}Mv[x][y][1])$$

or $$dI = \text{Clip3}(-dI\text{Limit}, dI\text{Limit}-1, (\text{gradient}H[x][y] * \text{diff}Mv[x][y][0] + \text{gradient}V[x][y] * \text{diff}Mv[x][y][1]+1) >> 1)$$

In the above equation, Clip3(x, y, z) is a clipping function to clip variable z to a range between a lower boundary x and an upper boundary y. If z is smaller than x, Clip3(x, y, z)=x. If z is greater than y, Clip3(x, y, z)=y. Otherwise, Clip3(x, y, z)=z. The final prediction I' (i.e., sbSamplesLX$_L$[x][y]) is generated by adding the prediction offset (i.e., dI) to the original predictor (i.e., predSamplesLX$_L$[x+1][y+1]) as the following equation:

$$sb\text{SamplesLX}_L[x][y] = \text{predSamplesLX}_L[x+1][y+1] + dI.$$

In another example, the clipping on the prediction offset as shown above according to the present invention can be cast into the following forms:

$$dI = \text{gradient}H[x][y] * \text{diff}Mv[x][y][0] + \text{gradient}V[x][y] * \text{diff}Mv[x][y][1]$$

$dILimit=(1<<\max(13,BitDepth_Y+1))$ $pb\text{Samples}[x][y]=\text{predSamples}[x+1][y+1]+\text{Clip3}(-dILimit,dILimit-1,(dI+1)>>1)$ The above equations correspond to the case that K is equal to max(14, bit-depth+2) and the range corresponds to [$-2^{(K-1)}$, $2^{(K-1)}-1$] (note that $2^{(K-1)}$ is the same as $1<<(K-1)$).

In yet another example, the variable dI is derived as follows:

$dI=\text{gradient}H[x][y]*\text{diff}MvLX[x][y][0]+\text{gradient}V[x][y]*\text{diff}MvLX[x][y][1]$ Prediction sample value at location (x, y) in the sub-block is derived as follows:

$dILimit=(1<<\max(13,BitDepth+1))$ $sb\text{Samples}LX_L[x][y]=\text{predSamples}LX_L[x+1][y+1]+\text{Clip3}(-dILimit,dILimit-1,dI)$ Again, in the above equations, K is equal to max(14, bit-depth+2) and the range corresponds to [$-2^{(K-1)}$, $2^{(K-1)}-1$] (note that $2^{(K-1)}$ is the same as $1<<(K-1)$).

In another example, the dI in the emerging VVC specification JVET-O2001 can be modified as follow, where the dIlimit is the value of $2^K-1$ or the proposed clip range. The variable dI is derived as follows:

$dI=\text{Clip3}(0,dILimit,\text{gradient}H[x][y]*\text{diff}Mv[x][y][0]+\text{gradient}V[x][y]*\text{diff}Mv[x][y][1])$ $sb\text{Samples}LX_L[x][y]=\text{predSamples}LX_L[x+1][y+1]+dI$ In another example, the dI in the emerging VVC specification JVET-O2001 can be modified as follow, where the dIlimit is the value of $2^K-1$ or the proposed clip range. The variable dI is derived as follows:

$dI=\text{gradient}H[x][y]*\text{diff}Mv[x][y][0]+\text{gradient}V[x][y]*\text{diff}Mv[x][y][1]$ $pb\text{Samples}[x][y]=\text{predSamples}[x+1][y+1]+\text{Clip3}(0,dILimit,((dI+1)>>1))$ or $pb\text{Samples}[x][y]=\text{predSamples}[x+1][y+1]+\text{Clip3}(0,dILimit,dI)$ Note that, the prediction offset in this invention can be dI or ((dI+1)>>1).

In the second proposed method, the refined predictor (e.g. predictor after adding the prediction offset, I') is clipped to a certain predefined range or a derived range depending on the input, output or the target bit-depth. For example, the refined predictor can be clipped to 14, 15 or 16 bits, where the range can be [−8192, 8191], [−16384, 16383] or [−32768, 32767] respectively, or can be [0, 16383], [0, 32767] or [0, 65535] respectively. In another example, the refined predictor can be clipped within the range of [$-2^{(K-1)}$, $2^K-1)-1$] or [0, $2^K-1$], where the K (a positive integer) can be max(15, bit-depth+5), (bitdepth+5), max(16, bit-depth+6), (bitdepth+6), (bit-depth+8−max(2, 14−bit-depth)), max(16, bit-depth+4),max(16, bit-depth+5), (bit-depth+max(2, 14−bit-depth)+1), (bit-depth+max(2, 14−bit-depth)), (bit-depth+max(2, 14−bit-depth)+2), min(16, bit-depth+max(2, 14−bit-depth)), min(15, bit-depth+max(2, 14−bit-depth)), min(14, bit-depth+max(2, 14−bit-depth)), max(16, bit-depth+max(2, 14−bit-depth)), max(15, bit-depth+max(2, 14−bit-depth)), max(14, bit-depth+max(2, 14−bit-depth)), max(13, bit-depth+2), max(13, bit-depth+1), max(14, bit-depth+3), max(14, bit-depth+2), max(15, bit-depth+1), max(15, bit-depth+2), max(15, bit-depth+3), max(15, bit-depth+4), max(16, bit-depth+4), max(16, bit-depth+4), max(16, bit-depth+5), max(N, bit-depth+M) where N is a positive integer and M is an integer, (bit-depth+max(O, P-bit-depth)+Q) where the 0 is a positive integer and P and Q are integers, (bit-depth+max(R, S+bit-depth)+T) where the R is a positive integer and S and T are integers, max(16, sample bit-depth+max (2, 14−sample bit-depth)+1), max(16, sample bit-depth+max(2, 14−sample bit-depth)), max(16, sample bit-depth+max(2, 14−sample bit-depth)+2), max(16, sample bit-depth+max(2, 14−sample bit-depth)+3), max(16, sample bit-depth+max(2, 14−sample bit-depth)−1), or max(16, sample bit-depth+3).

For example, the pbSamples in the emerging VVC specification JVET-O2001 can be modified as follow, where the dSampleLimit is the value of $2^{(K-1)}$ or the proposed clip range.Prediction sample value, pbSamples[x][y], at location (x, y) in the sub-block is derived as follows:

$pb\text{Samples}[x][y]=\text{Clip3}(-d\text{SampleLimit},d\text{SampleLimit}-1,\text{predSamples}[x+1][y+1]+((dI+1)>>1))$ or $pb\text{Samples}[x][y]=\text{Clip3}(-d\text{SampleLimit},d\text{SampleLimit}-1,\text{predSamples}[x+1][y+1]+dI)$ or $pb\text{Samples}[x][y]=\text{Clip3}(-d\text{SampleLimit},d\text{SampleLimit}-1,\text{predSamples}[x+1][y+1]+\text{predictionOffset})$ In another example, the pbSamples in the emerging VVC specification JVET-O2001 can be modified as follow, where the dSampleLimit is the value of $2^K-1$ or the proposed clip range. Prediction sample value at location (x, y) in the sub-block is derived as follows:

$pb\text{Samples}[x][y]=\text{Clip3}(0,d\text{SampleLimit},\text{predSamples}[x+1][y+1]+((dI+1)>>1))$ or $pb\text{Samples}[x][y]=\text{Clip3}(0,d\text{SampleLimit},\text{predSamples}[x+1][y+1]+\text{predictionOffset})$ In the third proposed method, the interpolation results before rounded to the output bit-depth (e.g. predictor, I) is clipped to a certain predefined range or a derived range depending on the input, output or target bit-depth. For example, the interpolation results can be clipped to 14, 15 or 16 bits, where the range can be [−8192, 8191], [−16384, 16383] or [−32768, 32767] respectively, or can be [0, 16383], [0, 32767] or [0, 65535] respectively. In another example, the interpolation results can be clipped within the range of [$-2^{(K-1)}$, $2^{(K-1)}-1$] or [$2^K-1$], where the K (a positive integer) can be max(15, bit-depth+5), (bitdepth+5), or max(16, bit-depth+6) or bitdepth+6 or bit-depth+8−max (2, 14−bit-depth) or max(16, bit-depth+4), max(16, bit-depth+5), (bit-depth+7−max(2, 14−bit-depth)), (bit-depth+6−max(2, 14−bit-depth)), (bit-depth+max(2, 14−bit-depth)), (bit-depth+max(2, 14−bit-depth)+1), (bit-depth+max(2, 14−bit-depth)+2), (bit-depth+max(2, 14−bit-depth)−1), min (16, bit-depth+max(2, 14−bit-depth)), min(15, bit-depth+max(2, 14−bit-depth)), min(14, bit-depth+max(2, 14−bit-depth)), max(16, bit-depth+max(2, 14−bit-depth)), max(15, bit-depth+max(2, 14−bit-depth)), max(14, bit-depth+max(2, 14−bit-depth)), max(13, bit-depth+2), max(13, bit-depth+1), max(14, bit-depth+3), max(14, bit-depth+2), max(15, bit-depth+1), max(15, bit-depth+2), max(15, bit-depth+3), max (15, bit-depth+4), max(16, bit-depth+4), max(16, bit-depth+

5), max(N, bit-depth+M) where N is a positive integer and M is an integer, (bit-depth+max(O, P−bit-depth)+Q) where the O is a positive integer and P and Q are integers, (bit-depth+max(R, S+bit-depth)+T) where the R is a positive integer and S and T are integers, max(16, sample bit-depth+max(2, 14−sample bit-depth)+1), max(16, sample bit-depth+max(2, 14−sample bit-depth)), max(16, sample bit-depth+max (2, 14−sample bit-depth)+2), max(16, sample bit-depth+max(2, 14−sample bit-depth)+3), max(16, sample bit-depth+max(2, 14−sample bit-depth)−1), or max (16, sample bit-depth+3). In the example of using "bit-depth+max(2, 14−bit-depth)+1", the value of "bit-depth+max(2, 14−bit-depth)+1" is 15. The interpolation results are clipped within 15 bits, after adding the refinement offset. The interpolation results can then be stored in a 16-bits buffer, which is friendly with the 16-bits SIMD instruction. Moreover, for this 15-bits results, it is also SIMD friendly for simple bi-prediction average (e.g. adding an offset to the sum of the list0 and list1 results and then right shifting by 1 bit or right shifting to a target sample bit-depth).

For example, the predSampleLX$_L$ in the emerging VVC specification JVET-02001 can be modified as follow, where the predSampleLimit is the value of $2^K-1$ or the proposed clip range. The predicted luma sample value predSampleLX$_L$ is derived as follows:

If both xFrac$_L$ and yFrac$_L$ are equal to 0, the value of predSampleLX$_L$ is derived as follows:

predSample$LX_L$=refPic$LX_L$[xInt$_3$][yInt$_3$]<<shift3

Otherwise, if xFrac$_L$ is not equal to 0 and yFrac$_L$ is equal to 0, the value of predSampleLX$_L$ is derived as follows:

predSample$LX_L$=($\Sigma_i$=0$^7 f_L$[xFrac$_L$][i]*refPic$LX_L$[xInt$_i$][yInt$_3$])>>shift1

Otherwise, if xFrac$_L$ is equal to 0 and yFrac$_L$ is not equal to 0, the value of predSampleLX$_L$ is derived as follows:

predSample$LX_L$=($\Sigma_i$=0$^7 f_L$[yFrac$_L$][i]*refPic$LX_L$[xInt$_3$][yInt$_i$])>>shift1

Otherwise, if xFrac$_L$ is not equal to 0 and yFrac$_L$ is not equal to 0, the value of predSampleLX$_L$ is derived as follows:

The sample array temp[n] with n=0..7, is derived as follows:

temp[$n$]=($\Sigma_i$=0$^7 f_L$[xFrac$_L$][i]*refPic$LX_L$[xInt$_i$][yInt$_n$])>>shift1

The predicted luma sample value predSampleLX$_L$ is derived as follows:

predSample$LX_L$=($\Sigma_i$=0$^7$[yFrac$_L$][i]*temp[i])>>shift2

The predicted luma sample value predSampleLX$_L$ is further derived as follows:

predSample$LX_L$=Clip3(0,predSampleLimit,predSample$LX_L$)

In another embodiment, when the weighted prediction or bi-prediction with coding unit (CU) level weights (BCW) is enabled, the PROF refinement is disabled according to one embodiment of the present invention. In this way, the predictor before weighted prediction and BCW is garenteed to be within 16 bit.

The emerging VVC specification NET-02001 can be modified according to one embodiment of the present invention as follow.

The variable cbProfFlagLX is derived as follows:

If one or more of the following conditions are true, cbProfFlagLX is set to FALSE:
sps_affine_prof enabled flag is equal to 0.
fallbackModeTriggered is equal to 1.
numCpMv is equal to 2, cpMvLX[1][0] is equal to cpMvLX[0][0] and cpMvLX[1][1] is equal to cpMvLX[0][1].
numCpMv is equal to 3, cpMvLX[1][0] is equal to cpMvLX[0][0], cpMvLX[1][1] is equal to cpMvLX[0][1], cpMvLX[2][0] is equal to cpMvLX[0][0] and cpMvLX[2][1] is equal to cpMvLX[0][1].
weightedPredFlag is euql to 1 (one example of the weighted prediction being enabled is indicated by luma weight_1X_flag[ refIdxLX] not equal to 0)
bcwIdx is not equal to 0 (one example of the BCW being enabledis indicated by BcwIdx[xCb][yCb] not equal to 0)
Otherwise, cbProfFlagLX is set to TRUE.

Any of the foregoing proposed methods can be implemented in encoders and/or decoders. For example, any of the proposed methods can be implemented in an inter prediction module of an encoder and/or a decoder. Alternatively, any of the proposed methods can be implemented as a circuit coupled to inter prediction module of the encoder and/or the decoder.

Video encoders have to follow the foregoing syntax design so as to generate the legal bitstream, and video decoders are able to decode the bitstream correctly only if the parsing process is complied with the foregoing syntax design. When the syntax is skipped in the bitstream, encoders and decoders should set the syntax value as the inferred value to guarantee the encoding and decoding results are matched.

Figure 3:
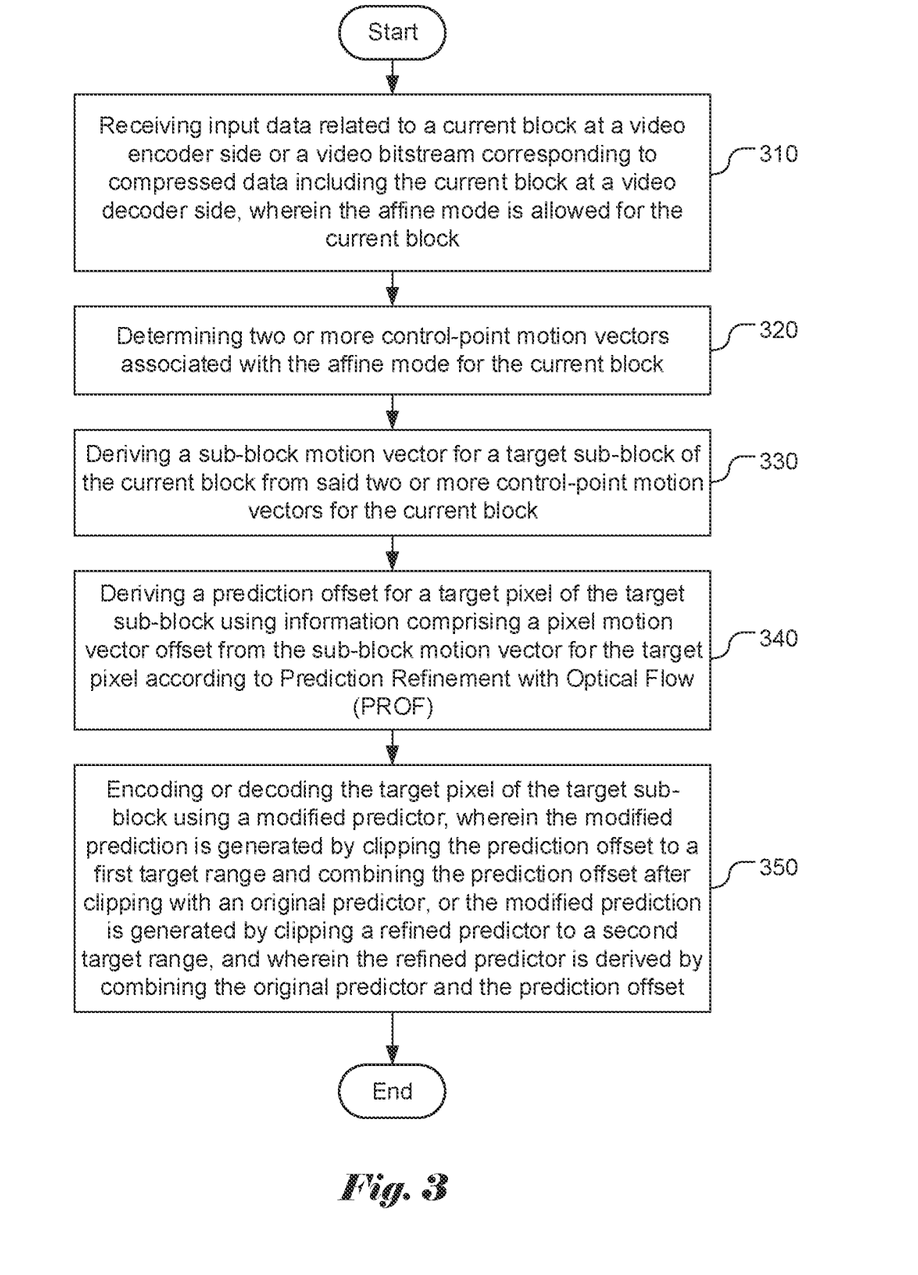
FIG. 3 illustrates an exemplary flowchart for a video coding system utilizing a coding tool set comprising an affine mode according to an embodiment of the present invention, where data clipping is used in the Prediction Refinement with Optical Flow (PROF) process to avoid the need for extending bit depth.

FIG. 3 illustrates an exemplary flowchart for a video coding system utilizing a coding tool set comprising an affine mode and a sub-block based affine modeaccording to an embodiment of the present invention, where data clipping is used in the Prediction Refinement with Optical Flow (PROF) process to avoid the need for extending bit depth. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input datarelated to a current block are received at a video encoder side or a video bitstream corresponding to compressed data including the current block is received at a video decoder side in step 310, wherein the affine mode is allowed for the current block. Two or more control-point motion vectors associated with the affine mode are determined for the current block in step 320. A sub-block motion vector is derived for a target sub-block of the current block from said two or more control-point motion vectors for the current block in step 330. A prediction offset is determined for a target pixel of the target sub-block using first information pixel motion vector offset from the sub-block motion vector for the target pixel according to Prediction Refinement with Optical Flow (PROF) in step 340. The target pixel of the target sub-block is encoded or decoded using a modified predictor in step 350, wherein the modified prediction is generated by clipping the prediction offset to a first target range and combining the prediction offset after clipping with an original predictor, or the modified prediction is generated by clipping a refined predictor to a second target range, and wherein the refined predictor is derived by combining the original predictor and the prediction offset.

The flowcharts shown are intended to illustrate an example of video according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of prediction for video data performed by a video encoder or a video decoder that utilizes a coding tool set comprising an affine mode, the method comprising:
receiving input data related to a current block at a video encoder side or a video bitstream corresponding to compressed data including the current block at a video decoder side, wherein the affine mode is allowed for the current block;
determining two or more control-point motion vectors associated with the affine mode for the current block;
deriving a sub-block motion vector for a target sub-block of the current block from said two or more control-point motion vectors for the current block;
deriving a prediction offset for a target pixel of the target sub-block using first information comprising a pixel motion vector offset from the sub-block motion vector for the target pixel according to Prediction Refinement with Optical Flow (PROF); and
encoding or decoding the target pixel of the target sub-block using a modified predictor, wherein the modified prediction is generated by clipping the prediction offset to a first target range and combining the prediction offset after clipping with an original predictor, or the modified prediction is generated by clipping a refined predictor to a second target range, and wherein the refined predictor is derived by combining the original predictor and the prediction offset,
wherein the first target range corresponds to [—dILimit, dILimit−1], wherein the dILimit is set to 1<<max(13, bit-depth+1) and the bit-depth corresponds to sample bit depth of the current block.

2. The method of claim 1, wherein the first target range is equal to [−8192, 8191] when the sample bit depth of the current block is equal to 10 bits.

3. The method of claim 1, wherein the pixel motion vector offset is derived based on second information related to pixel position offset from a center of the target sub-block and said two or more control-point motion vectors.

4. The method of claim 3, wherein the prediction offset is derived based on a linear combination of the pixel motion vector offset in x direction and the pixel motion vector offset in y direction.

5. An apparatus for Inter prediction for video coding performed by a video encoder or a video decoder that utilizes a coding tool set comprising an affine mode, the apparatus comprising one or more electronic circuits or processors arranged to:
receive input data related to a current block at a video encoder side or a video bitstream corresponding to compressed data including the current block at a video decoder side, wherein the affine mode is allowed for the current block;
determine two or more control-point motion vectors associated with the affine mode for the current block;
derive a sub-block motion vector for a target sub-block of the current block from said two or more control-point motion vectors for the current block;
derive a prediction offset for a target pixel of the target sub-block using first information comprising a pixel motion vector offset from the sub-block motion vector for the target pixel according to Prediction Refinement with Optical Flow (PROF); and
encode or decode the target pixel of the target sub-block using a modified predictor, wherein the modified prediction is generated by clipping the prediction offset to a first target range and combining the prediction offset after clipping with an original predictor, or the modified prediction is generated by clipping a refined predictor to a second target range, and
wherein the refined predictor is derived by combining the original predictor and the prediction offset,
wherein the first target range corresponds to [—dILimit, dILimit −1], wherein the dILimit is set to 1<<max(13, bit-depth+1) and the bit-depth corresponds to sample bit depth of the current block.

6. The apparatus of claim 5, wherein the first target range is equal to [−8192, 8191] when the sample bit depth of the current block is equal to 10 bits.

7. The apparatus of claim 5, wherein the pixel motion vector offset is derived based on second information related to pixel position offset from a center of the target sub-block and said two or more control-point motion vectors.

8. The apparatus of claim 7, wherein the prediction offset is derived based on a linear combination of the pixel motion vector offset in x direction and the pixel motion vector offset in y direction.

* * * * *